United States Patent [19]
Iio

[11] Patent Number: 5,477,700
[45] Date of Patent: Dec. 26, 1995

[54] AIR CONDITIONING SYSTEM WHICH CAN BE USED IN AN ELECTRIC CAR

[75] Inventor: Masahiro Iio, Konan, Japan

[73] Assignee: Zexel Corporation, Tokyo, Japan

[21] Appl. No.: 314,286

[22] Filed: Sep. 30, 1994

[30] Foreign Application Priority Data

Oct. 8, 1993 [JP] Japan .................................. 5-277659

[51] Int. Cl.⁶ .............................. F25B 41/00; F25B 19/00
[52] U.S. Cl. .................................. 62/231; 62/90; 62/196.4
[58] Field of Search ................................... 62/90, 196, 4, 62/173, 160, 324.6, 324.4

[56] References Cited

U.S. PATENT DOCUMENTS 3,017,162   1/1962   Haines et al. ................ 62/196.4 X
5,355,689  10/1994   Hara et al. ................... 62/196.4 X
5,388,421   2/1995   Matsuoka ........................... 62/90
5,404,729   4/1995   Matsuoka et al. ................... 62/90

Primary Examiner—William E. Wayner
Attorney, Agent, or Firm—Wenderoth, Lind & Ponack

[57] ABSTRACT

In order to perform a heating operation with the correct quantity of coolant at all times by retaining an approximately fixed quantity of coolant in a main condenser during the initial stage of a heating operation in an air conditioning system, a first valve is opened and, at the same time, a second valve is closed before executing the heating operation to run the cooling/heating cycle as a cooling cycle for a specific length of time. Then, after opening a bypass passage by opening the second valve, the first valve is closed to close off the passage leading to the main condenser to start the heating cycle. As a result, a fixed quantity of coolant can always be retained within the main condenser, realizing the operation of a heating cycle with a correct coolant quantity.

21 Claims, 3 Drawing Sheets 5,477,700

1

AIR CONDITIONING SYSTEM WHICH CAN BE USED IN AN ELECTRIC CAR

BACKGROUND OF THE INVENTION

1. Field of the Invention

The present invention relates to an air conditioning system for an electric car which is provided with an evaporator and a sub condenser within the air conditioning duct and which controls the temperature by adjusting the quantity of air passing through the sub condenser with a mixing door.

2. Description of the Related Art

To cite an example of an air conditioning system in the prior art, the air conditioning system disclosed in Japanese Unexamined Patent Publication S61-101020 is provided with a main coolant circuit that passes through the coolant compressor, the main condenser and the expansion valve to reach the evaporator, and a sub coolant circuit that branches between the coolant compressor and the main condenser via a directional control valve. The sub coolant circuit communicates with the evaporator via the condenser for heating (sub condenser) which is placed in the air passage of the evaporator on the cabin side.

This air conditioning system has a main coolant circuit, which is used for cooling, and a sub coolant circuit, which is used for heating. Switching between cooling and heating is executed by selecting the main coolant circuit or the sub coolant circuit with the directional control valve.

However, in an air conditioning system such as the one described above, since the main coolant circuit, which uses the main condenser, is selected for the cooling operation and the sub coolant circuit, which does not use the main condenser, is selected for the heating operation, and since there is a great difference in the volumetric capacity of the elements which compose the cooling operation cycle and the heating operation cycle, there is a great difference in the correct coolant filling quantity for the two different operations.

Also, depending upon the stopped state of the cycle and the temperature difference, approximately 60% of the coolant filling quantity may remain in the main condenser (a large hold-up volume) and if a heating operation is performed under these circumstances (insufficient gas), such problems as poor heating performance, stoppage of the operation due to a protective device functioning or seizure of components may occur.

Furthermore, if the quantity of the coolant retained in the main condenser is small (a small hold-up volume), there may be too much coolant flowing in the heating cycle and such problems as abnormally high pressure or stoppage due to the functioning of a protective device may occur.

SUMMARY OF THE INVENTION

Accordingly, the object of the present invention is to provide an air conditioning system which can be used in an electric car which can perform a heating operation with the correct quantity of coolant at all times by stablizing the quantity of coolant retained in the main condenser at a fixed level during the initial stage of the heating operation.

Thus, the present invention is an air conditioning system which can be used in an electric car that is provided with an evaporator and a sub condenser, the air flow quantity of which is controlled with a mixing door within the air conditioning duct, and that effects cooling and heating cycles wherein at least the compressor, the main condenser,

2 the sub condenser, the expansion valve and the evaporator are connected in that order, a bypass passage that bypasses the main condenser is provided, a first valve that is located upstream of the main condenser and downstream of the branching point of the bypass passage and which opens and closes the passage to the main condenser, and a second valve that opens and closes the bypass passage. In this air conditioning system for an electric car, when the heating operation is requested, the first valve is opened for a specific length of time to open the passage to the main condenser and, at the same time, the second valve is closed to close off the bypass passage. Then, the second valve is opened to open the bypass passage and after that, the first valve is closed to close off the passage to the main condenser.

Consequently, in the present invention, since the first valve is opened and, at the same time, the second valve is closed before performing the heating operation in order to operate in a cooling cycle for a specific length of time, and then, after opening the bypass passage by opening the second valve, the first valve is closed to close off the passage to the main condenser in order to operate in the heating cycle, an approximately consistent quantity of coolant can be retained within the main condenser. This makes it possible to operate the heating cycle at the correct coolant quantity, thus achieving the object described above.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings.

DETAILED DESCRIPTION OF THE PREFERRED EMBODIMENT

The following is an explanation of the embodiment according to the present invention in reference to the drawings.

Figure 1:
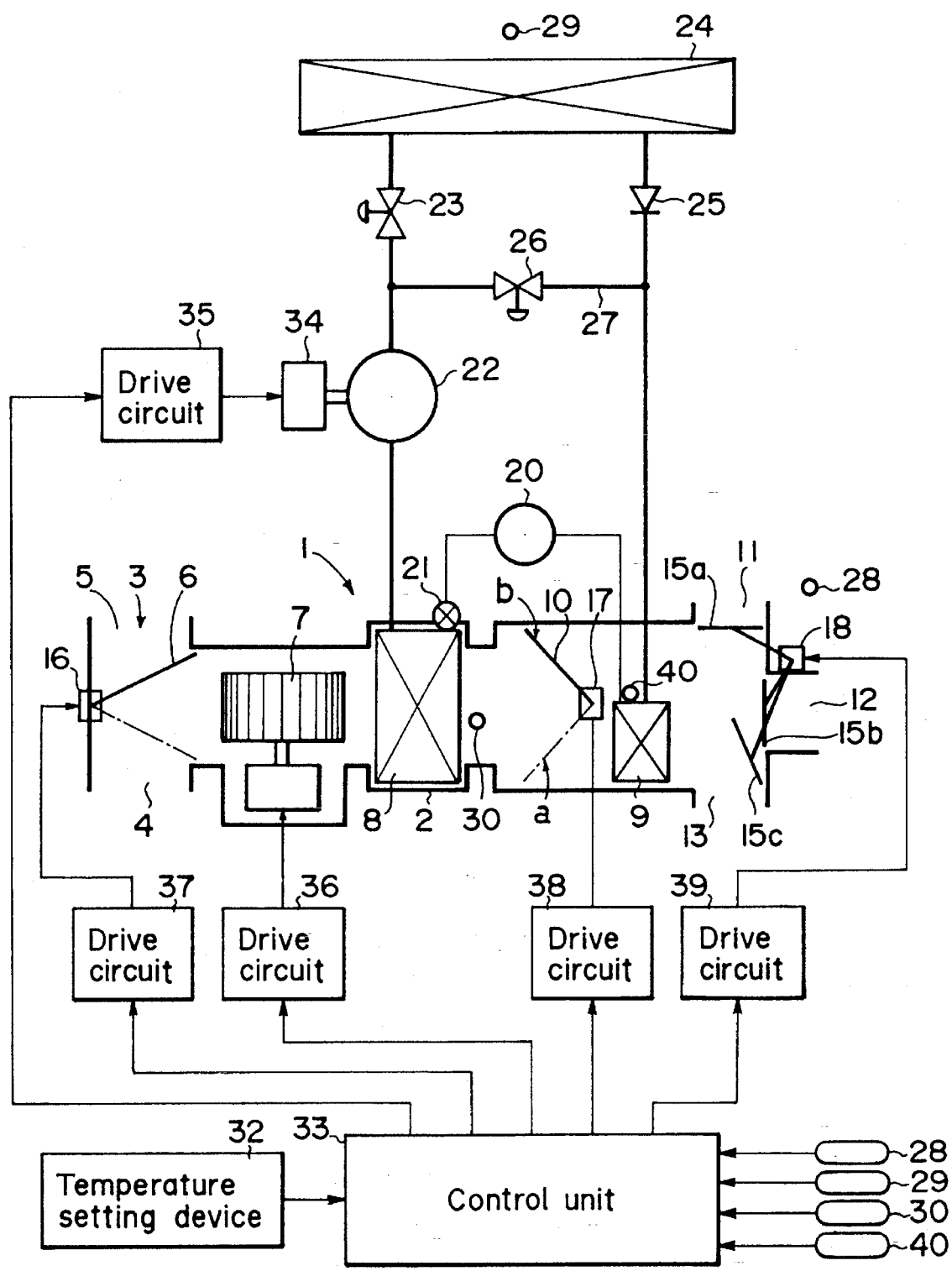
FIG. 1 is an illustration showing the structure of the air conditioning system for an electric car in an embodiment according to the present invention.

The air conditioning system which can be used in an electric car 1 according to the present invention shown in FIG. 1 can be mounted in an electric car and is provided with an intake device 3 on the extreme upstream side of the air conditioning duct 2 and the degree of openness of the inner air intake port 4 and the outer air intake port 5 is adjusted by the intake door 6 which is driven by the actuator 16. The air that is drawn in by the rotation of the air blower 7 via this intake device 3 is sent to the evaporator 8 and the sub condenser 9 where it is subjected to heat exchange. This sub condenser 9 is provided downstream from the evaporator and the ratio of the air that passes through the sub condenser 9 to the air that bypasses it can be varied by controlling the degree of openness of the mixing door 10 with the actuator 17.

Note that when the mixing door 10 is at the position (a), shown by the dotted line, where its openness is at 0%, the air flow quantity of the sub condenser 9 is at its minimum and when the mixing door 10 is at the position (b), shown by the solid line, where its openness is at 100%, the air flow quantity of the sub condenser 9 is at its maximum.

The extreme downstream side of the air conditioning duct 2 is divided into the defrost outlet port 11, the ventilation outlet port 12 and the heat outlet port 13 before opening into the cabin. The mode doors 15a, 15b and 15c are provided at the branching portions, and by operating these mode doors 15a, 15b and 15c with the actuator 18, the outlet mode is switched among the vent mode, the bi-level mode, and the heat mode.

The sub condenser 9 which is positioned on the outlet side of the coolant, is connected by piping to the intake side of the evaporator 8 via the liquid tank 20 and the expansion valve 21. The outlet side of the evaporator 8 is connected to the intake side of the compressor 22 by piping. In addition, the outlet side of the compressor 22 is connected to the intake side of the main condenser 24 via the first valve (electromagnetic valve) 23 by piping, and the outlet side of the main condenser 24 is connected to the intake side of the sub condenser 9 via the check valve 25. Furthermore, the bypass passage 27 that communicates between the outlet side of the compressor 22 and the outlet side of the check valve 25 is provided and this bypass passage 27 is, in turn, provided with the second valve (electromagnetic valve) 24 that opens and closes the bypass passage 27. Note that the check valve 25 is provided to prevent the backflow to the main condenser 24 that would otherwise occur when the bypass passage 27 is opened.

With this, through open/close control of the first electromagnetic valve 23 and the second electromagnetic valve 26, the cooling cycle in which the coolant discharged from the compressor 22 circulates through the main condenser 24, the check valve 25, the liquid tank 20, the expansion valve 21 and the evaporator 8 in that order and the heating cycle, in which the main condenser 24 is bypassed and the coolant circulates through the sub condenser 9, the liquid tank 20 the expansion valve 21 and the evaporator 8 in that order, can be selected alternately.

Specifically, when cooling is requested, the first electromagnetic valve 23 is opened and the second electromagnetic valve 26 is closed to deliver the coolant to the cooling cycle. The high-pressure, high temperature gaseous coolant that is discharged from the compressor 22, releases heat and is condensed in the process of traveling from the main condenser 24 to the sub condenser 9. In this case, since the gaseous coolant is condensed almost completely in the main condenser 24, the temperature at the sub condenser 9 becomes lower compared to its temperature during the heating operation which will be explained later. However, since the temperature at the sub condenser 9 is considerably higher than that at the evaporator 8, the mixing door 10 must be completely closed.

Since this suppresses the thermal effect of the sub condenser 9, the temperature at the evaporator 8 can be controlled with the rotation of the compressor and the temperature of the discharged air can be adjusted. As a result, the air that has passed the evaporator and has been cooled, bypasses the sub condenser 9 to be discharged into the cabin, cooling it.

Furthermore, in the air conditioning system for an electric car 1 structured as described above, since fine temperature control is required after the cabin temperature becomes stabilized, the so called mixing door control, in which the outlet air temperature is minutely controlled by opening/closing the mixing door 10 through a specific range, inducing part of the air discharged from the evaporator 8 to the sub condenser 9 to be heated and mixing this heated air with the air that has bypassed the sub condenser 9, thereby achieving the desired air temperature.

During heating operation, the first electromagnetic valve 23 is closed and the second electromagnetic valve 26 is opened to deliver the coolant to the heating cycle. The high-pressure, high temperature gaseous coolant that is discharged from the compressor 22, is sent to the sub condenser 9, bypassing the main condenser 24 and it releases its heat into the air that passes through the sub condenser 9 to become condensed and to turn into a liquid coolant. After this, the liquid coolant which is separated from the vapor goes into the liquid tank 20 and passes through the expansion valve 21 to be adiabatically expanded. Then it absorbs heat from the air that passes through the evaporator 8 to become evaporated and finally it turns into a low pressure gaseous coolant, returning to the compressor 8.

During this heating operation, the air that releases heat while passing through the evaporator, absorbs heat when it passes through the sub condenser 9 and since the heat absorption at the sub condenser 9 is larger than the heat released to the evaporator 8 by the equivalent of the work done by the compressor 22, the air temperature rises, thus enabling the heating operation.

In order to control the air conditioning system for an electric car 1, structured as described above, the control unit 33 is composed of a central processing unit (CPU), a read only memory (ROM), a random access memory (RAM), an input/output port (I/O) and the like, which are not shown in the figures. The output signal from the temperature setting device 32 that sets the target temperature for the cabin, as well as the output signals from the cabin internal thermosensor 28, the outside air thermosensor 29, the evaporator thermosensor 30 and the sub condenser coolant outlet temperature detection sensor 40 are input to the control unit 33. These various signals are first processed by a specific program and then, via the drive circuits 35, 36, 37, 38 and 39, the control signals are output to the drive motor 34 for the compressor 22, the air blower motor, the actuators 16, 17 and 18 to control the outlet volume of the compressor, the rotational speed of the air blower 7, the degree of openness of the mixing door 10 and the switching between the intake mode and the outlet mode.

In this air conditioning system for an electric car 1, the storage capacity for coolant in the cooling cycle is larger than the storage capacity for coolant in the heating cycle by an amount equivalent to the volumetric capacity from the first electromagnetic valve 23 through the main condenser 24 to the check valve 25 minus the volumetric capacity of the bypass passage 27. Because of this, the difference between the cabin temperature and the outside air temperature is large, and consequently, when the condensation rate in the main condenser 24 is high, the quantity of coolant retained in the main condenser 24 (hereafter referred to as hold-up coolant quantity) is large. If a heating operation is performed in this condition, the coolant quantity required is greater than the specific quantity is trapped inside the main condenser 24, resulting in reduced quantity of coolant circulating in the heating cycle. As a result, as shown by line B" in FIG. 3, the pressure at the sub condenser 9 does not increase, which can lead to insufficient heating performance by the sub condenser 9 or seizure of the compressor 22.

Figure 3:
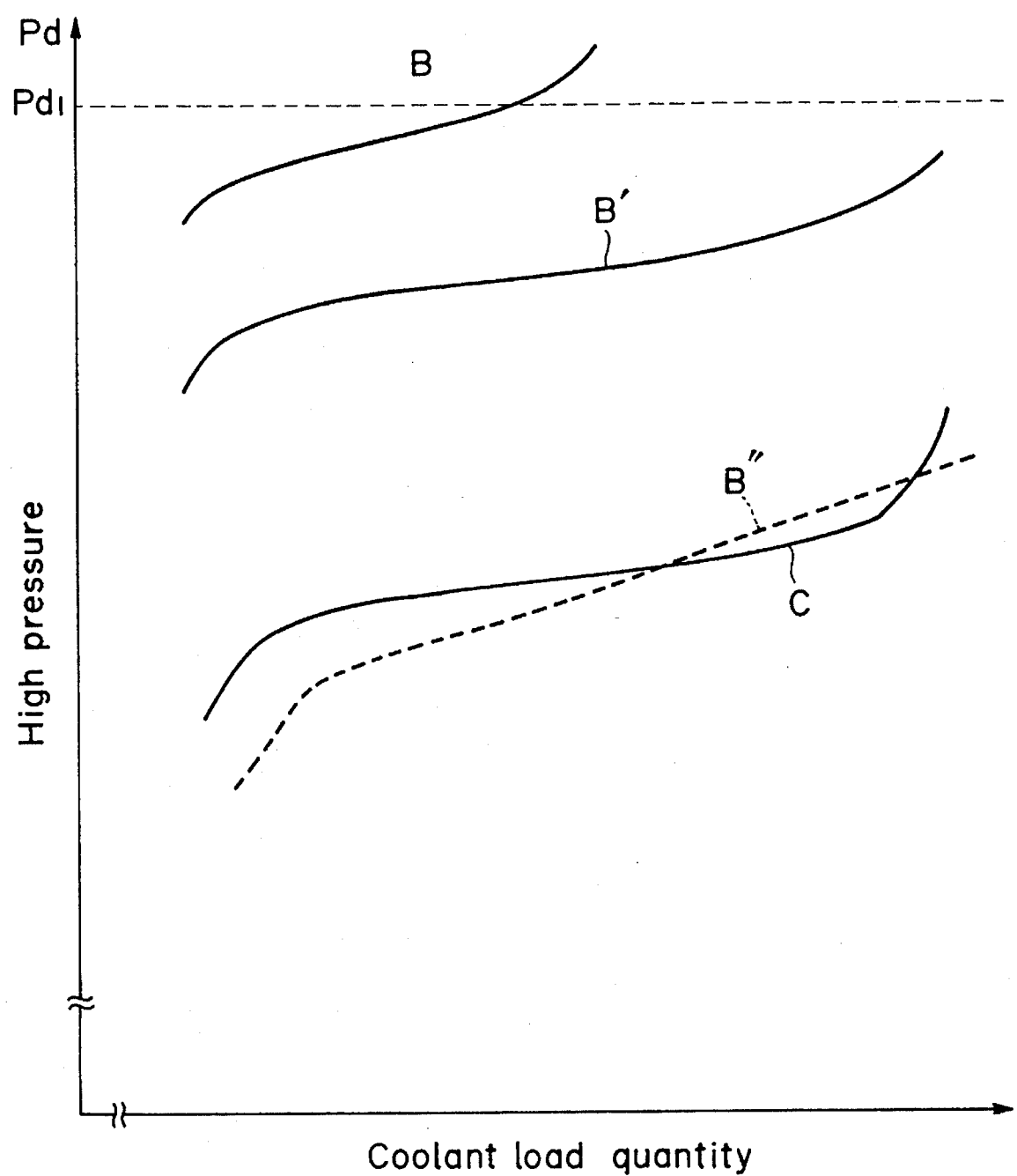
FIG. 3 is a characteristics chart showing the characteristics of the coolant filling quantity and high pressure in cooling and heating cycles.

In contrast, when the operation is performed only in the heating cycle and the hold-up coolant quantity in the main condenser 24 is small, the quantity of coolant circulating in the heating cycle will be excessive, as shown by line B in FIG. 3. Consequently, the pressure at the sub condenser 9 becomes excessive, i.e., over the value Pd1 set on the high pressure switch (DPS) and this will cause problems such as operation stoppage or the like. Note that in FIG. 3, B represents the characteristic curve that shows the relationship between the coolant filling quantity and the high pressure when the hold-up coolant quantity is equal to 0 during a heating operation, and likewise, B' represents a characteristic curve when the hold-up quantity is approximately 20%. This latter is the characteristic curve that results when the correct quantity of coolant is circulating in the heating cycle. Now, the characteristics represented by B" indicated with the dotted line, results when the hold-up quantity is large and, therefore, the quantity of coolant circulating during heating operation is insufficient. C represents the characteristics during a cooling operation.

Figure 2:
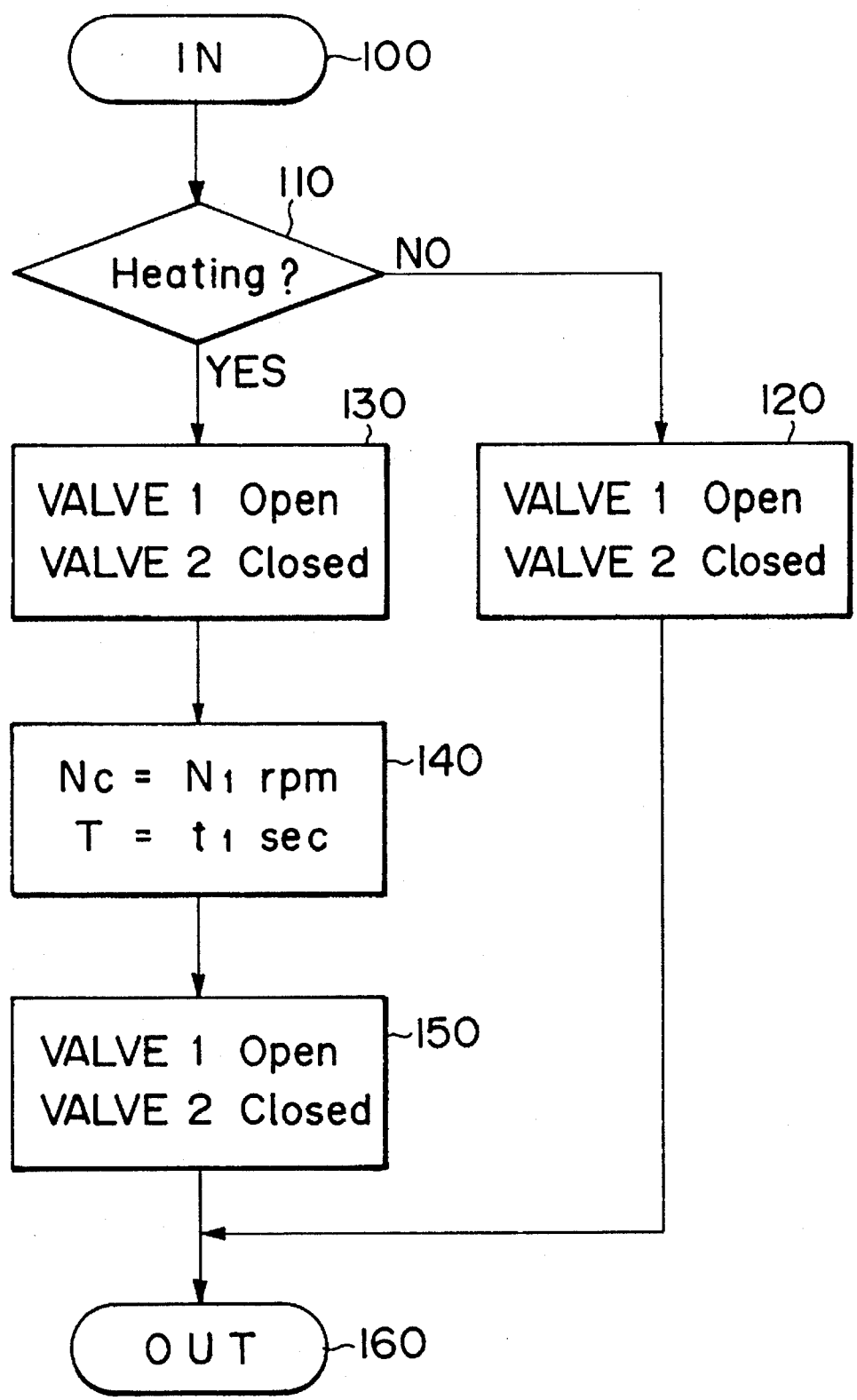
FIG. 2 is a flowchart showing an example of air conditioning control in the embodiment according to the present invention.

Thus, the air condenser system for an electric car 1 according to the present invention performs control as shown in the flowchart in FIG. 2 to stabilize the hold-up coolant quantity in the main condenser 24. This control, which is initiated from step 100, is inserted in the middle of the main control routine, which performs regular air conditioning control (not shown). It determines whether or not a heating operation is under way in step 110. If it is decided that heating is not going on (NO) the control operation proceeds to step 120 to open the first electromagnetic valve (valve 1) 23 and close the second electromagnetic valve (valve 2) 26 to initiate a cooling cycle. The cooling operation is then performed and the control operation returns to the main control routine from step 160.

If it is determined that a heating operation is underway in step 110 (YES), the control operation proceeds to step 130 to perform cooling operation control similar to that performed in the step 120 and the rotation rate for the compressor Nc is set at a specific value N1 and also the timer T is set at a specific time t1 in step 140. With this, the cooling operation performed in step 130 is carried on for a specific length of time under the specific conditions set in step 140. Note that in this embodiment, the idling rotation rate of, for example, 1500 rpm may be set for the specific value N1 and the numerical value of approximately 90 seconds may be set for t1. These settings are determined taking into consideration the length of time that the coolant takes to complete the cycle after reaching the main condenser 24, relative to the length of time that the coolant takes to travel one cycle (approximately 45 seconds) to facilitate setting the hold-up coolant quantity in the main condenser 24.

After leaving a specific quantity of coolant in the main condenser 24, the first electromagnetic valve 23 is closed to close off the passage leading to the main condenser 24 and then the second electromagnetic valve 26 is opened to open the bypass passage 27 in step 150. This configuration constitutes the heating cycle, thereby shifting to the heating operation. Note that after performing the control in step 150, the control operation returns to the main control routine.

As has been explained so far, regarding the cooling and heating cycles of the air conditioning system for an electric car 1, in the heating operation, the cooling cycle is first run for a specific length of time under specific conditions and the excess coolant of the cooling cycle relative to the heating cycle is retained in the main condenser 24. Then the heating cycle is run. With this, the correct quantity of coolant for the heating cycle, which has a smaller volumetric capacity compared to the cooling cycle, can be circulated, making it possible to operate cooling and heating operations efficiently in the air conditioning system for an electric car 1.

Consequently, according to the present invention, since the cooling cycle is run for a specific length of time under specific conditions before running the heating cycle, a specific quantity of coolant can be always retained in the main condenser, achieving the correct quantity of coolant for the heating cycle. As a result, correct quantities for both the cooling cycle and the heating cycle are achieved and efficient cooling/heating control can be executed. Also, since the coolant is retained in the main condenser, the necessity for a large receiver tank is eliminated, achieving, a saving of space and a reduction in weight and cost.

What is claimed is:

1. An air conditioning system that is provided with an evaporator and a sub condenser within an air conditioning duct, in which the quantity of airflow is controlled with a mixing door, wherein cooling and heating cycles are constituted by connecting at least a compressor, a main condenser, said sub condenser, an expansion valve and said evaporator in that order, said air conditioning system comprising:

a bypass passage which bypasses said main condenser;

a first valve which is located upstream of said main condenser and downstream of the divergence point of said bypass passage and which opens and closes the passage to said main condenser;

a second valve that is located in said bypass passage and which opens and closes said bypass passage; and a control means for controlling said first and second valves such that when a heating operation is requested; first, said first valve is opened for a specific length of time to open said passage to said main condenser and, at the same time, said second valve is closed to close off said bypass passage, thereby performing a cooling operation; and next, said second valve is opened to open said bypass passage and said first valve is closed to close off said passage to said main condenser to perform the heating operation.

2. An air conditioning system according to claim 1, wherein said control means further controls said first and second valves such that when a cooling operation is requested;

said first valve is opened to open said passage to said main condenser and, at the same time, said second valve is closed to close off said bypass passage.

3. An air conditioning system according to claim 1, further comprising a means for controlling the rotation rate of said compressor during said cooling operation so as to be equal to a predetermined rotation rate.

4. An air conditioning system according to claim 3, wherein said control means controls said first valve such that said specific length of time is longer than the time said coolant requires to travel one cycle of said cooling cycle.

5. An air conditioning system according to claim 1, wherein said control means control said first valve such that said specific length of time is longer than the time the coolant requires to travel one cycle of said cooling cycle.

6. An air conditioning system that is provided with an evaporator and a sub condenser within an air conditioning duct, in which the quantity of airflow is controlled with a mixing door, wherein cooling and heating cycles are constituted by connecting at least a compressor, a main condenser, said sub condenser, an expansion valve and said evaporator in that order, said air conditioning system comprising:

a bypass passage which bypasses said main condenser;

a first valve which is located upstream of said main condenser and downstream of the divergence point of said bypass passage and which opens and closes the passage to said main condenser;

a second valve that is located in said bypass passage and which opens and closes said bypass passage; wherein said first valve and said second valve are both electromagnetic valves; and a means for controlling said first and second valves such that when a heating operation is requested;

first, said first valve is opened for a specific length of time to open said passage to said main condenser and, at the same time, said second valve is closed to close off said bypass passage, thereby performing a cooling operation; and next, said second valve is opened to open said bypass passage and said first valve is closed to close off said passage to said main condenser to perform the heating operation.

7. An air conditioning system according to claim 6, wherein said control means further controls said first and second valves such that when a cooling operation is requested;

said first valve is opened to open said passage to said main condenser and, at the same time, said second valve is closed to close off said bypass passage.

8. An air conditioning system according to claim 6, further comprising a means for controlling the rotation rate of said compressor during said cooling operation so as to be equal to a predetermined rotation rate.

9. An air conditioning system according to claim 8, wherein said control means controls said first valve such that said specific length of time is longer than the time said coolant requires to travel one cycle of said cooling cycle.

10. An air conditioning system according to claim 6, wherein said control means controls said first valve such that said specific length of time is longer than the time said coolant requires to travel one cycle of said cooling cycle.

11. An air conditioning system that is provided with an evaporator and a sub condenser within an air conditioning duct, in which the quantity of airflow is controlled with a mixing door, wherein cooling and heating cycles are constituted by connecting at least a compressor, a main condenser, said sub condenser, an expansion valve and said evaporator in that order, said air conditioning system comprising:

a bypass passage which bypasses said main condenser;

a first valve which is located upstream of said main condenser and downstream of the divergence point of said bypass passage and which opens and closes the passage to said main condenser;

a second valve that is located in said bypass passage and which opens and closes said bypass passage;

a check valve located downstream of said main condenser and upstream of the divergence point of said bypass passage for preventing backflow toward said main condenser; and a control means for controlling said first and second valves such that when a heating operation is requested;

first, said first valve is opened for a specific length of time to open said passage to said main condenser and, at the same time, said second valve is closed to close off said bypass passage, thereby performing a cooling operation; and next, said second valve is opened to open said bypass passage and said first valve is closed to close off said passage to said main condenser to perform the heating operation.

12. An air conditioning system for an electric car according to claim 11, further comprising a means for controlling the rotation rate of said compressor during said cooling operation so as to be equal to a predetermined rotation rate.

13. An air conditioning system according to claim 12, wherein said control means control said first valve such that said specific length of time is longer than the time said coolant requires to travel one cycle of said cooling cycle.

14. An air conditioning system according to claim 11, wherein said control means further controls said first and second valves such that when a cooling operation is requested;

said first valve is opened to open said passage to said main condenser and, at the same time, said second valve is closed to close off said bypass passage.

15. An air conditioning system according to claim 11, wherein said control means controls said first valve such that said specific length of time is longer than the time said coolant requires to travel one cycle of said cooling cycle.

16. An air conditioning system having an evaporator, and a sub condenser in which the quantity of airflow is controlled with a mixing door, within an air conditioning duct, wherein cooling and heating cycles are constituted by connecting at least, a compressor, a main condenser, said subcondenser, an expansion valve and said evaporator in that order, said air conditioning system comprising:

a bypass passage which bypasses said main condenser;

a first valve located upstream of said main condenser and downstream of the divergent point of said bypass passage to open/close the passage to said main condenser;

a second valve located in said bypass passage to open/close said bypass passage;

a cooling operation means for controlling said first and second valves such that when a cooling operation is requested, (a) opening the first valve to open the passage to said main condenser, (b) closing the second valve to close said bypass passage; and a heating operation means for controlling said first and second valves such that when a heating operation is requested, (a) opening the first valve to open the passage to said main condenser, and closing the second valve to close the bypass passage to do the cooling operation in a specific time, then (b) opening the second valve to open the bypass passage, then (c) closing the first valve to close the passage to said main condenser.

17. An air conditioning system according to claim 16, wherein said first valve and said second valve are both electromagnetic valves.

18. An air conditioning system according to claim 17, wherein said heating operation means controls said first and second valves such that said specific time is longer than the time the coolant circulates one cycle of said cooling and heating cycle.

19. An air conditioning system according to claim 16, further comprising a check valve located downstream of said main condenser and upstream of the divergence point of said bypass passage for preventing backblow toward said main condenser.

20. An air conditioning system according to claim 19, wherein said heating operation means controls said first and second valves such that said specific time is longer than the time the coolant circulates one cycle of said cooling and heating cycle.

21. An air conditioning system according to claim 16, wherein said heating operation means controls said first and second valves such that said specific time is longer than the time the coolant circulates one cycle of said cooling and heating cycle.

* * * * *